United States Patent [19]

Shono

[11] 4,384,779
[45] May 24, 1983

[54] SHUTTER SPEED CHANGE GEAR SUPPORTING MECHANISM

[75] Inventor: Tetsuji Shono, Kawagoe, Japan

[73] Assignee: Asahi Kogaku Kogyo Kabushiki Kaisha, Tokyo, Japan

[21] Appl. No.: 313,703

[22] Filed: Oct. 21, 1981

[30] Foreign Application Priority Data

Oct. 21, 1980 [JP] Japan .......................... 55-149843[U]

[51] Int. Cl.³ ............................................. G03B 9/32
[52] U.S. Cl. .................................................. 354/242
[58] Field of Search ................................ 354/241–244, 354/205; 74/665 K, 665 P

[56] References Cited

U.S. PATENT DOCUMENTS 625,003  5/1899  Whiting ...................... 74/665 K X

FOREIGN PATENT DOCUMENTS 2103320  5/1971  Fed. Rep. of Germany ...... 354/241

Primary Examiner—John Gonzales
Attorney, Agent, or Firm—Sughrue, Mion, Zinn, Macpeak and Seas

[57] ABSTRACT

In a speed change gear supporting mechanism, the winding, top curtain speed change and bottom curtain speed change gears are all slidably mounted to a common support cylinder which is in turn rotatably supported about a shaft via axially displaced roller elements.

3 Claims, 4 Drawing Figures

SHUTTER SPEED CHANGE GEAR SUPPORTING MECHANISM

BACKGROUND OF THE INVENTION

In general, in a focal plane shutter wherein shutter curtains of flexible material such as cloth are wound on a drum, the drum makes several 360° rotations for one run of the shutter and the rotation of the drum is converted into rotation of a speed change gear which rotates less than 360° rotations for each shutter operation, so that the winding operation and the shutter running operation are controlled by the speed change gear.

The left half of FIG. 1 is a sectional view showing one example of a conventional speed change gear supporting mechanism for such a shutter mechanism. A winding gear 3, a top curtain speed change gear 4 and a bottom curtain speed change gear 5 are rotatably mounted on a speed change gear shaft 2 which is fixedly secured to a camera body 1. A winding pin 3a is provided on the lower surface of the winding gear 3 and the pin 3a is engaged with a pin 4a embedded in the upper surface of the top curtain speed change gear 4. A pin 4b is provided on the lower surface of the top curtain speed change gear 4 and it is engaged with a pin 5a provided on the upper surface of the bottom curtain speed change gear 5. Therefore, as the winding gear 3 is turned, the top curtain speed change gear 4 and the bottom curtain speed change gear 5 are turned through the engagement of the pins.

In the supporting mechanism shown on the left side of FIG. 1, the gears 3, 4 and 5 are slidably turned around the speed change gear shaft 2, and the winding force is transmitted through the engaged pins. Due to the stability of the slide bearing between each gear and the shaft 2, the degree of vibration of each gear is low, and the shutter mechanism is stable. However, the bearing portions are liable to be damaged, which increases the frictional loss. Since this frictional loss is added to the shutter charging force, a large force is required for winding the shutter.

These difficulties may be overcome by inserting a rolling element between the speed change gear shaft and each of the gears as shown in the right half of FIG. 1. While it is true that the friction loss of the supporting mechanism is smaller than that of the supporting mechanism shown in the left half of FIG. 1, in many cases it is difficult to provide the rolling elements in two rows, i.e. upper and lower rows for each of the gears, because of the limit in the axial dimensions of each gear, and therefore only one row of rolling elements are usually provided for each gear near the center thereof in the axial direction. Accordingly, if the portion of each gear supporting the rolling elements is not accurately fitted, then the degree of vibration of the gear is increased. In such a case it is necessary to increase the lengths of the abutting pins and the margins between the gears in the axial direction. Furthermore, since the surfaces of the top curtain speed change gear 4 and the bottom curtain speed change gear 5 vibrate considerably, it is difficult to accurately set members for locking the speed change gears 4 and 5, which makes the shutter speed unstable.

In the case of an electrical shutter, the initial operation of the top curtain speed change gear 4, which is effected by the release operation after the winding operation has been accomplished, operates a timing switch. Since the gear 4 vibrates excessively, it is difficult to set the switching time of the timing switch, and this will also make the shutter speed unstable.

SUMMARY OF THE INVENTION

An object of this invention is to provide a shutter speed change gear supporting mechanism in which the above-described various drawbacks accompanying a conventional supporting mechanism have been eliminated and the frictional loss is less.

Briefly, this is achieved by a support mechanism wherein a support cylinder is rotatably mounted to the speed change gear shaft via roller elements at least at either end thereof, and the individual gears are then slidably mounted on the support cylinder via slide bearing surfaces.

BRIEF DESCRIPTION OF THE DRAWINGS

The invention will be more clearly understood from the following description in conjunction with the accompanying drawings, in which.

The left half of FIG. 1 is a sectional view showing one example of a conventional speed change gear supporting mechanism, and the right half is a sectional view showing another example of the conventional speed change gear supporting mechanism incorporating rolling elements.

DESCRIPTION OF THE PREFERRED EMBODIMENTS

Figure 1:
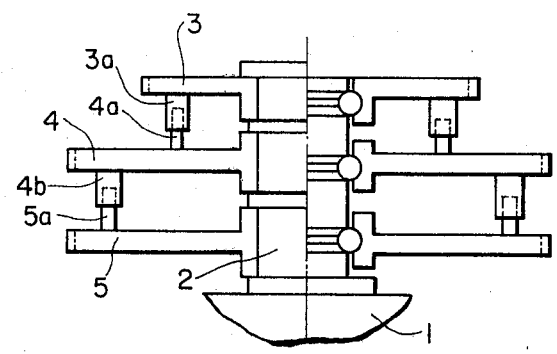
Figure 2:
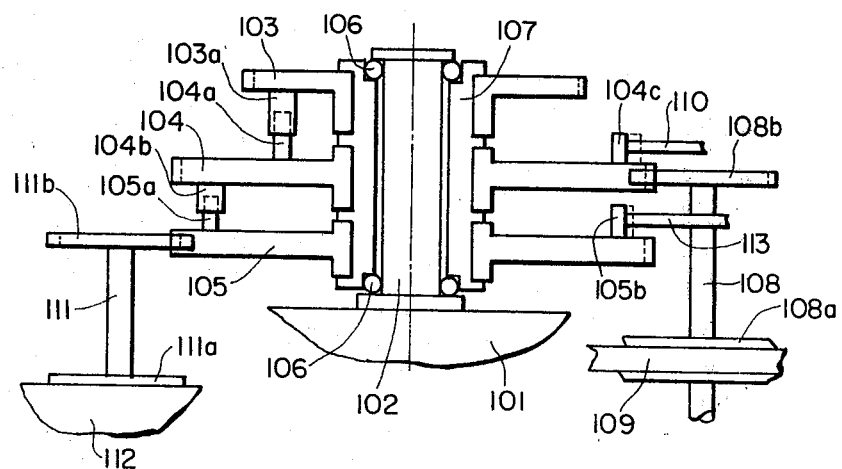
FIG. 2 is a sectional view showing one example of a shutter speed change gear supporting mechanism according this invention.
Figure 3:
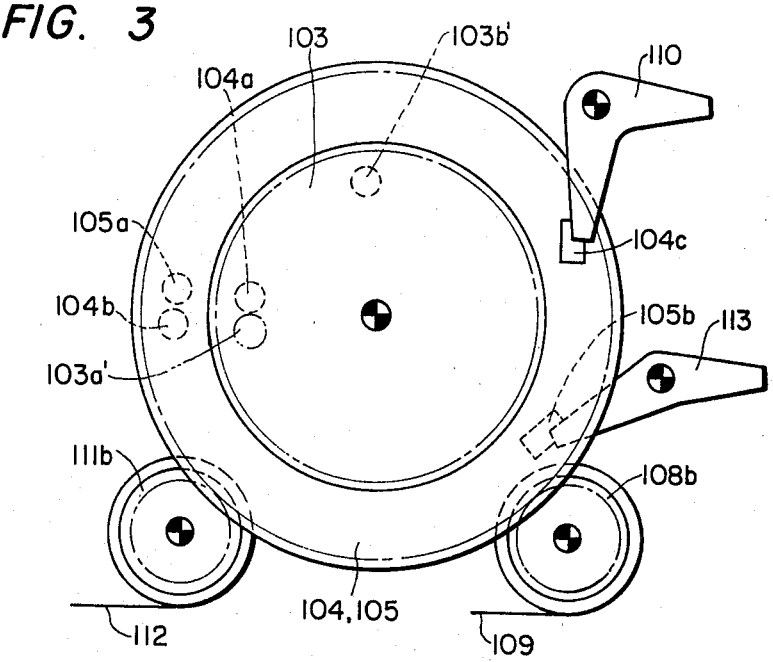
FIG. 3 is a diagram showing a state of the supporting mechanism of the invention after the winding operation has been completed.
Figure 4:
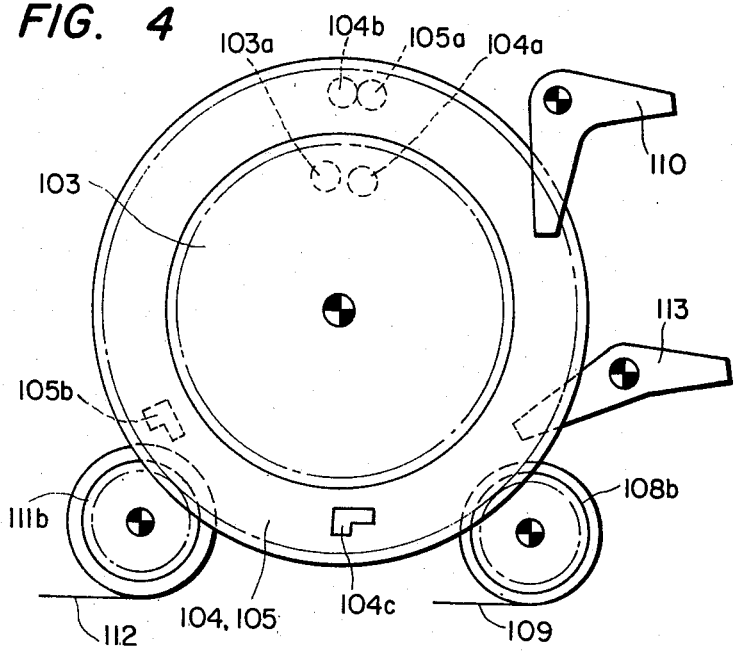
FIG. 4 is a diagram showing another state of the supporting mechanism of the invention after the shutter has run.

This invention will now be described with reference to FIGS. 2 through 4. FIG. 2 is a sectional view showing one example of a shutter speed change gear supporting mechanism according to this invention. FIG. 3 is a front view of the supporting mechanism in FIG. 2 when a shutter winding operation has been accomplished. FIG. 4 is also a front view of the supporting mechanism in FIG. 2 when a shutter has run.

A support cylinder 107 is rotatably mounted through upper and lower rolling elements 106 on a speed change gear shaft 102 which is fixedly secured to a camera body 101. A winding gear 103 is rotatably mounted on the support cylinder 107. A top curtain speed change gear 104 is provided below the winding gear 103 and is rotatably mounted on the support cylinder 107. A bottom curtain speed change gear 105 is provided below the top curtain speed change gear 104 and is rotatably mounted on the support cylinder 107. A winding pin 103a is provided on the lower surface of the winding gear 103, and it is engaged with a pin 104a provided on the upper surface of the top curtain speed change gear 104. A pin 104b is provided on the lower surface of the top curtain speed change gear 104 and it is engaged with a pin 105a provided on the upper surface of the bottom curtain speed change gear 105. The top curtain speed change gear 104 is engaged with a top curtain pinion 108b. A top curtain spool 108a is fixedly mounted on a shaft 108 of the top curtain pinion 108b. A top curtain ribbon 109 is wound on the top curtain spool 108a. Tension is given to the top curtain ribbon 109 by a spring (not shown), so that the top curtain speed change gear 104 engaged with the top curtain pinion 108b is caused to turn counterclockwise.

When the shutter winding operation has been accomplished, a top curtain locking lever 110 is engaged with a locking piece 104c fixed secured to the peripheral portion of the upper surface of the top curtain speed change gear 104 as shown in FIG. 3. Therefore, the force of the spring is inhibited, and the top curtain speed change gear 104 is maintained positioned as shown in FIG. 3.

The bottom curtain speed change gear 104 is also maintained stationary. A bottom curtain shaft spool 111a is fixedly mounted on a shaft 111 of a bottom curtain pinion 111b which is engaged with the bottom curtain speed change gear 105. A bottom curtain 112 is wound on the bottom curtain spool 111a. Tension is given to the bottom curtain 112 by a bottom curtain spring (not shown) at all times, so that the bottom curtain speed change gear 105 engaged with the bottom curtain pinion 105 is caused to turn counterclockwise. However, when the shutter winding operation has been accomplished, a bottom curtain locking lever 113 is engaged with a locking piece 105b which is fixedly secured to the peripheral position of the upper surface of the bottom curtain speed change gear 105, and therefore the bottom curtain speed change gear 105 is maintained positioned as shown in FIG. 3.

The shutter speed change gear supporting mechanism according to this invention is constructed as described above. The supporting mechanism of the invention is different from the conventional one in that the support cylinder 107 is rotatably mounted through rolling elements 106 on the speed change gear shaft 102 fixedly secured to the camera body 101, and the winding gear 103, the top curtain speed change gear 104 and the bottom curtain speed change gear 105 are rotatably mounted directly (without using rolling elements) on the support cylinder 107. The reason for this constructional difference will become more clear from the following description of the operation of the supporting mechanism.

When the camera is released, the top curtain locking lever 110 is turned counter-clockwise as is well known in the art. As a result, the top curtain locking lever 110 is disengaged from the locking piece 104c of the top curtain speed change gear 104, the latter gear 104 is turned counterclockwise, and the shutter top curtain (not shown) is run. After a predetermined period of time, the bottom curtain locking lever 113 is disengaged from the locking piece 105b of the bottom curtain speed change gear 105. As a result, the gear 105 is turned counterclockwise, and the bottom curtain 112 is run.

The relationships of the support cylinder 107, the top curtain speed change gear 104 and the bottom curtain speed change gear 105 in this operation are as follows. Since the top curtain speed change gear 104 and the bottom curtain speed change gear 105 merely follow the top curtain pinion 108b and the bottom curtain pinion 111b, respectively, the frictional loss between the support cylinder 107, the top curtain speed change gear 104 and the bottom curtain speed change gear 105 is very small. Accordingly, in the shutter operation, the shutter mechanism is maintained stable even if no rolling elements are provided between the speed change gears 104 and 105 and the support cylinder 107.

When the winding lever (not shown) is operated under the condition that the shutter has run as shown in FIG. 4, the winding force is transmitted to the winding gear 103. As a result, the winding gear 103 is turned clockwise, while the winding pin 103a of the winding gear 103 is abutted against the pin 104a on the upper surface of the top curtain speed change gear 104, so that the latter gear 104 is turned clockwise. As the pin 104b on the lower surface of the top curtain speed change gear 104 is engaged with the pin 105a on the upper surface of the bottom curtain speed change gear 105, the latter 105 is also turned clockwise. In this operation, the relationships of the support cylinder 107, the winding gear 103, the top curtain speed change gear 104 and the bottom curtain speed change gear 105 are as follows. The winding gear 103, the top curtain speed change gear 104 and the bottom curtain speed change gear 105 are turned counterclockwise because of the engagement of the pins, and the rolling elements 106 are interposed between the speed change gear shaft 102 and the support cylinder 107. Therefore, the frictional loss between the support cylinder 107, and the three gears 103, 104 and 105 is larger than that between the support cylinder 107 and the speed change gear shaft 102. Therefore, in the winding operation, the winding gear 103, the top curtain speed change gear 104, the bottom curtain speed change gear 105 and the support cylinder 107 can be regarded as one unit which turns, as a single drive unit, around the speed change gear shaft 102 through the rolling elements 106. Therefore, the provision of the rolling elements 106 substantially reduces the frictional loss in the winding operation.

After the winding operation has been accomplished, the winding gear must be turned as the winding lever is restored, to return the winding pin 103a of the winding gear 103 to the position 103b' (indicated by the dotted line in FIG. 3) from the position 103a' (indicated by the two-dot chain line in FIG. 3), in order that the shutter can run in response to the next release operation. However, when the winding operation has been accomplished, forces are applied to the top curtain speed change gear 104 and the bottom curtain speed change gear 105 by the top curtain pinion 108b and the bottom curtain pinion 111b, respectively, and therefore the top curtain speed change gear 104 and the bottom curtain speed change gear 105 press strongly against the support cylinder 107. Accordingly, if the winding gear 103 is integral with the support cylinder 107, then it is necessary to restore the winding lever against the pressing forces which are applied from the top curtain speed change gear 104 and the bottom curtain speed change gear 105 to the support cylinder 107. Accordingly, the winding gear 103 should be rotatably mounted on the support cylinder 107. In this case, the friction between the winding gear 103 and the support cylinder 107 is much smaller than that between the support cylinder 107, the top curtain speed change gear 104 and the bottom curtain speed change gear 105, and the winding gear 103 will easily follow the winding lever restoring operation. Therefore, the winding lever can be smoothly restored without interposing rolling elements between the winding gear 103 and the support cylinder 107.

As is clear from the above description, in this invention, when the winding gear, the top curtain speed change gear and the bottom curtain speed change gear are operated as drive units, they are turned by means of the rolling elements, and when they are operated individually as follower units with small frictional loss, they are turned by means of the sliding bearing between their respective inner surfaces and the support cylinder 107, rather than via the rolling elements. Therefore, with the supporting mechanism according to this invention, the winding torque is just as small as in the supporting mechanism in which a rolling element is provided in each of the gears, and the shutter performance is as stable as a supporting mechanism in which slide bearings are provided.

With the supporting mechanism of this invention, the speed change gear positioning accuracy is high and therefore the shutter operation is stable when compared with those in which the rolling element is provided for each of the winding gear, the top curtain speed change gear and the bottom curtain speed change gear. Furthermore, the supporting mechanism of this invention is advantageous in that winding torque is equivalent to that of the conventional supporting mechanism and the construction is simpler than that of the conventional supporting mechanism, and that high accuracy is not required in fitting the components. Accordingly the supporting mechanism can be manufactured at low cost.

What is claimed is:

1. A shutter speed change gear supporting mechanism of the type wherein a plurality of gears are mounted for rotation about a shaft, said mechanism comprising:
   a shaft;
   a support cylinder rotatably mounted about said shaft; and
   a plurality of gears rotatably mounted to the outer periphery of said support cylinder, said plurality of gears including a bottom curtain speed change gear coupled for rotation with movement of a bottom curtain, a top curtain speed change gear coupled for rotation with movement of a top curtain and a winding gear, each of said top and bottom curtain speed change gears being rotated as follower units when their respective curtains run, said mechanism further including means coupling said top and bottom curtain speed change gears for rotation by said winding gear as drive units for winding said top and bottom curtains, respectively, said support cylinder rotating with respect to said shaft when said gears are rotated as drive units and said top and bottom curtain speed change gears rotating with respect to said support cylinder when rotating as follower units.

2. A shutter speed change gear supporting mechanism as claimed in claim 1, wherein said support cylinder is rotatably mounted to said shaft via roller elements between said shaft and support cylinder and said plurality of gears are rotatably mounted to said cylinder via sliding contact surfaces between said gears and cylinder.

3. A shutter speed change gear supporting mechanism as claimed in claim 2, wherein said roller elements comprises at least first and second groups of roller elements displaced from one another along an axial direction of said shaft.

* * * * *